(12) United States Patent
Mandalia et al.

(10) Patent No.: US 7,360,239 B2
(45) Date of Patent: Apr. 15, 2008

(54) BIOMETRIC MULTIMODAL CENTRALIZED AUTHENTICATION SERVICE

(75) Inventors: Baiju D. Mandalia, Boca Raton, FL (US); Pradeep P. Mansey, Coral Springs, FL (US)

(73) Assignee: International Business Machines Corporation, Armonk, NY (US)

( * ) Notice: Subject to any disclaimer, the term of this patent is extended or adjusted under 35 U.S.C. 154(b) by 638 days.

(21) Appl. No.: 10/741,732

(22) Filed: Dec. 19, 2003

(65) Prior Publication Data

US 2005/0138391 A1 Jun. 23, 2005

(51) Int. Cl.
*H04L 9/00* (2006.01)
(52) U.S. Cl. .......................................... 726/5; 713/186
(58) Field of Classification Search ........ 713/185–186, 713/182–183, 155; 382/100, 115–126, 128; 705/50, 67, 71, 72; 726/1–8, 11–12; 340/5.52
See application file for complete search history.

(56) References Cited

U.S. PATENT DOCUMENTS

| | | | |
|---|---|---|---|
| 4,993,068 A * | 2/1991 | Piosenka et al. ............. | 380/23 |
| 5,566,327 A | 10/1996 | Sehr | |
| 6,268,788 B1 | 7/2001 | Gray | |
| 6,957,337 B1 * | 10/2005 | Chainer et al. ............. | 713/186 |
| 2002/0180586 A1 | 12/2002 | Kitson et al. | |
| 2003/0031348 A1 | 2/2003 | Kuepper et al. | |
| 2003/0095641 A1 | 5/2003 | Vishik et al. | |
| 2003/0109306 A1 | 6/2003 | Karmarkar | |
| 2004/0059923 A1 * | 3/2004 | ShamRao ................... | 713/186 |
| 2004/0193893 A1 * | 9/2004 | Braithwaite et al. ........ | 713/186 |
| 2004/0230810 A1 * | 11/2004 | Hillhouse ................... | 713/186 |
| 2005/0021983 A1 * | 1/2005 | Arnouse ..................... | 713/186 |

OTHER PUBLICATIONS

Sugiura, A., et al., *A User Interface Using Fingerpringt Recognition—Holding Commands and Data Objects on Fingers—*, pp. 71-76, 1998, C&C Media Research Laboratories, NEC Corporation.

\* cited by examiner

*Primary Examiner*—Gilberto Barron, Jr.
*Assistant Examiner*—Canh Le
(74) *Attorney, Agent, or Firm*—Richard A. Tomlin, Esq.; Steven M. Greenberg, Esq.; Carey Rodriguez Greenberg & Paul LLP

(57) ABSTRACT

A central system in communication with the one or more applications is configured for storing an identifying information of a user. The identifying information includes a biometric identifying data. The central system is further configured for prompting the user for a confirmatory biometric data when the user accesses any of the one or more voice applications connected to the central system. The system compares the confirmatory biometric data with the biometric identifying data. The system authenticates the user if the confirmatory biometric data matches a portion of the biometric identifying data.

4 Claims, 3 Drawing Sheets

BIOMETRIC MULTIMODAL CENTRALIZED AUTHENTICATION SERVICE

BACKGROUND OF THE INVENTION

1. Statement of the Technical Field

The present invention relates to the field of computer speech technology and more particularly to the authentication and verification of the identity of users using one or more biometric modalities.

2. Description of the Related Art

Speech based voice services are fast replacing existing touch-tone based interactive voice services. As speech technology matures, it will enable a host of new voice-based services. These services will be used across a wide array of businesses offering numerous products and services through numerous points of contact with the customer. Each time a customer wishes to access any of the voice based services, he or she will generally have to interact with a voice application serving as the front end of the service in question.

Currently, when a voice service is used via telephone there is typically a need to authenticate the caller in order to service that caller. In current systems, the caller generally uses the touch-tone keypad to enter identifying codes and/or PINs. Alternatively, the caller may be able to take advantage speech recognition technology in the voice application to speak commands and codes into the telephonic device communicating with the voice application. With advent of speaker verification technology it is possible to identify a caller based on their voice. However, this technology requires a caller to enroll their voice prior to the voice being used for identification and authentication. As a user uses more and more voice based services, he or she would have to go through the same enrollment process with each new voice application, or would have to settle for more traditional ID and/or PIN methods for authentication. This enrollment process would be cumbersome and subject to error, and may discourage users from using and accessing voice based services.

And while voice remains one of the easiest forms of ubiquitous access, multi-modal handheld devices like deskphones, cellphones, and PDAs are broadening the means for voice access to the various voice applications providing voice services. These multi-modal devices offer not only voice-based means of communication, but also offer other forms of data input which may be used for authentication and verification, such as pen-based input, camera or imaging devices, and scanners, all of which may be used to identify a user and communicate with a voice application.

It would be useful therefore, to provide a method and system that served users across a network of voice applications, such that users would only have to enroll once for using any of the voice applications, and could use each voice service through a variety of authentication means enabled by the technologies incorporated into the various multi-modal devices available to the user.

SUMMARY OF THE INVENTION

The present invention addresses the deficiencies of the art in respect to services requiring user authentication and verification, and provides a novel and non-obvious method, system and service for the biometric authentication and verification of the identity of users accessing one or more applications.

Methods consistent with the present invention provide a method of authenticating and verifying the identity of users accessing one or more applications. An identifying information of a user is stored in a central system in communication with the one or more applications. The identifying information includes a biometric identifying data. The user is prompted for a confirmatory biometric data when the user accesses any of the one or more voice applications. The confirmatory biometric data is compared with the biometric identifying data stored in the central system. The user is authenticated if the confirmatory biometric data matches a portion of the biometric identifying data.

Systems consistent with the present invention include a system for authenticating and verifying the identity of users accessing one or more applications. A central system in communication with the one or more applications is configured for storing an identifying information of a user. The identifying information includes a biometric identifying data. The central system is further configured for prompting the user for a confirmatory biometric data when the user accesses any of the one or more applications, and for comparing the confirmatory biometric data with the biometric identifying data. The system authenticates the user if the confirmatory biometric data matches a portion of the biometric identifying data.

Additional aspects of the invention will be set forth in part in the description which follows, and in part will be obvious from the description, or may be learned by practice of the invention. The aspects of the invention will be realized and attained by means of the elements and combinations particularly pointed out in the appended claims. It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute part of the this specification, illustrate embodiments of the invention and together with the description, serve to explain the principles of the invention. The embodiments illustrated herein are presently preferred, it being understood, however, that the invention is not limited to the precise arrangements and instrumentalities shown, wherein.

DETAILED DESCRIPTION OF THE PREFERRED EMBODIMENTS

The present invention is a method, system, and service for authenticating and verifying the identity of users accessing one or more applications across a network. As used herein, the term "user" shall refer to any person that accesses, logs into, or otherwise communicates with am "application" over a network. As used herein, an "application" can be any data processing or interactive application running on any computing platform that is connected to the network. An application can be, by way of non-limiting example, a voice application having a voice-enabled or speech-enabled technology. Applications can be spread out over the network in numerous physical locations, such as, for example, in various retail points of sale for businesses selling their products and/or services by communicating to customers through their respective voice applications. Also, as specifically used herein, an "application" can have, in addition to or in lieu of a voice-based mode of communication, one or more other modes of communication, such as touch-tone dialing, keyboard or text entry, or visual imaging.

Also as used herein, a "central system" shall refer to any combination of computing hardware or software which can be aggregated in a specific, discrete location, or distributed across various locations, that is separate and distinct from a network of applications. The central system can be connected to the applications through any communications network, internet, intranet, and the like.

Also as used herein, a "biometric data" shall refer to any data that relates to the biological make-up of a user. Examples of biometric data include: (i) a fingerprint of the user, (ii) a photograph or image of the user, (iii) a signature of the user, (iv) a recording of the voice of a user, or a unique "voiceprint" processed from such a recording, (v) a DNA sequence of a user, or (vi) a retinal scan of a user. It is readily understood that there may be several other forms of biometric data not specifically enumerated herein, which biologically identify a user, and therefore are all contemplated under the definition of biometric data herein. A "class" of biometric data shall refer to any particular type or category of biometric data, such as fingerprints, signatures, images, DNA, and the like.

Figure 1:
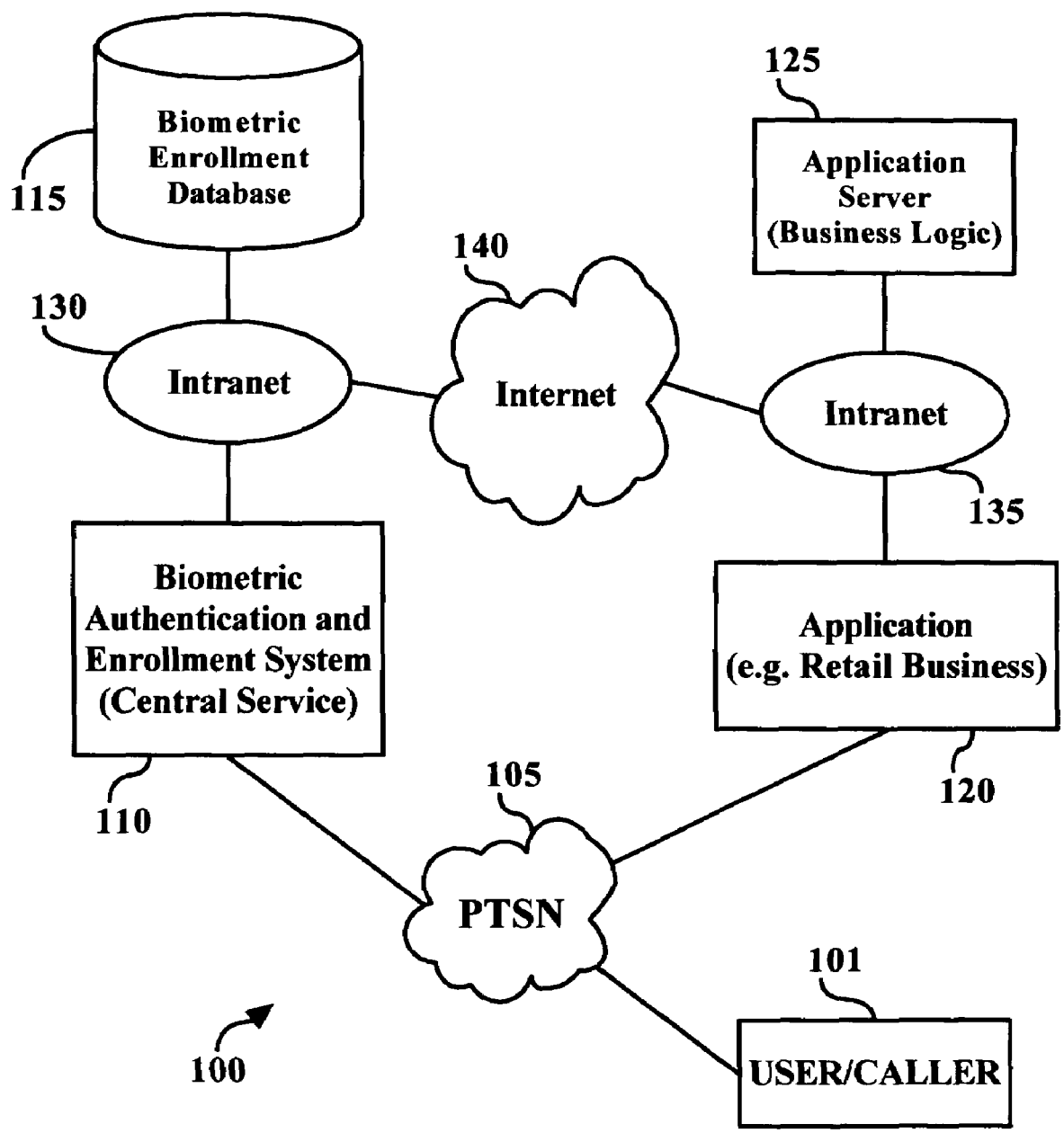
FIG. 1 is a schematic illustration of a network wherein the user authentication and verification service of the present invention can be implemented.

The present invention is an implementation of a multimodal biometric authentication service that can be used by any voice application independent of the speech technology being used by that application, from a centralized location and with multimodal capability. FIG. 1 is a schematic illustration of a network wherein the user authentication and verification service of the present invention can be implemented. The overall network 100 can include a user or caller 101, a public telephone switched network (PTSN) 105, a biometric authentication and enrollment system server 110, an enrollment database 115, an application 120, an application server 125, a first intranet 130, a second intranet 135, and a global telecommunications network such as the internet 140.

Generally, the user/caller 101 dials into either the biometric enrollment and authentication system server 110 or the application 120, using the PTSN 105. The connection between the user 101 and system 110 and application 120 can be through a number of means, and is not limited to a PTSN. IP telephony would be one other means of connection, among others. System 110 is a centralized automated system that is set apart from the application 120. The application 120 can be the front end of a retail business that is subscribing to the user authentication and verification service implemented by the present invention and managed by central system 110. The application 120 may actually entail a plurality of applications, each running for a separate retail business. The central system 110 is a separate system that functions independent of all the applications 120. The central system 110 can have its own central database 115. An intranet can be used to communicate between the central system 110, which can include computing logic and processors, and the database 115, which can include the memory for the data stored and managed by the central system 110. Each application 120 can have its own computing logic and separate computing platform 125, which may also be connected to the application 120 via an intranet 135. All of the components in overall network 100 can be connected via the internet 140.

In one embodiment of the present invention, a user/subscriber 101 calls central system 110 to enroll to use a Dual Tone Multi-Frequency (DTMF) or speech based application, such as a voice application. This enrollment results in a numeric PIN or ID code being sent back to the subscriber 101. The enrollment can also entail collecting some form of biometric data from the user for authentication and verification purposes. Alternatively, the first time a subscriber 101 accesses any application 120, he/she can be taken through the enrollment process, including collection of data for multimodal biometric authentication. The information collected and obtained by the application 120 can then be relayed to the central system 110 where it can be stored in the database 115.

However, once a user 101 has enrolled, either directly into the central system 110 or through an application 120, whenever the user accesses another application 120, the application will first determine whether the user has already enrolled, and if so, the user will not have to enroll again. Instead, if the subscriber connects to another application 120, such as by calling a voice application, the application can collect the subscriber's speech and authenticate the subscriber by communicating with the central system 110 and database 115, which will have stored the subscribers speech pattern or voice print, or other form of biometric identifying data.

Figure 2:
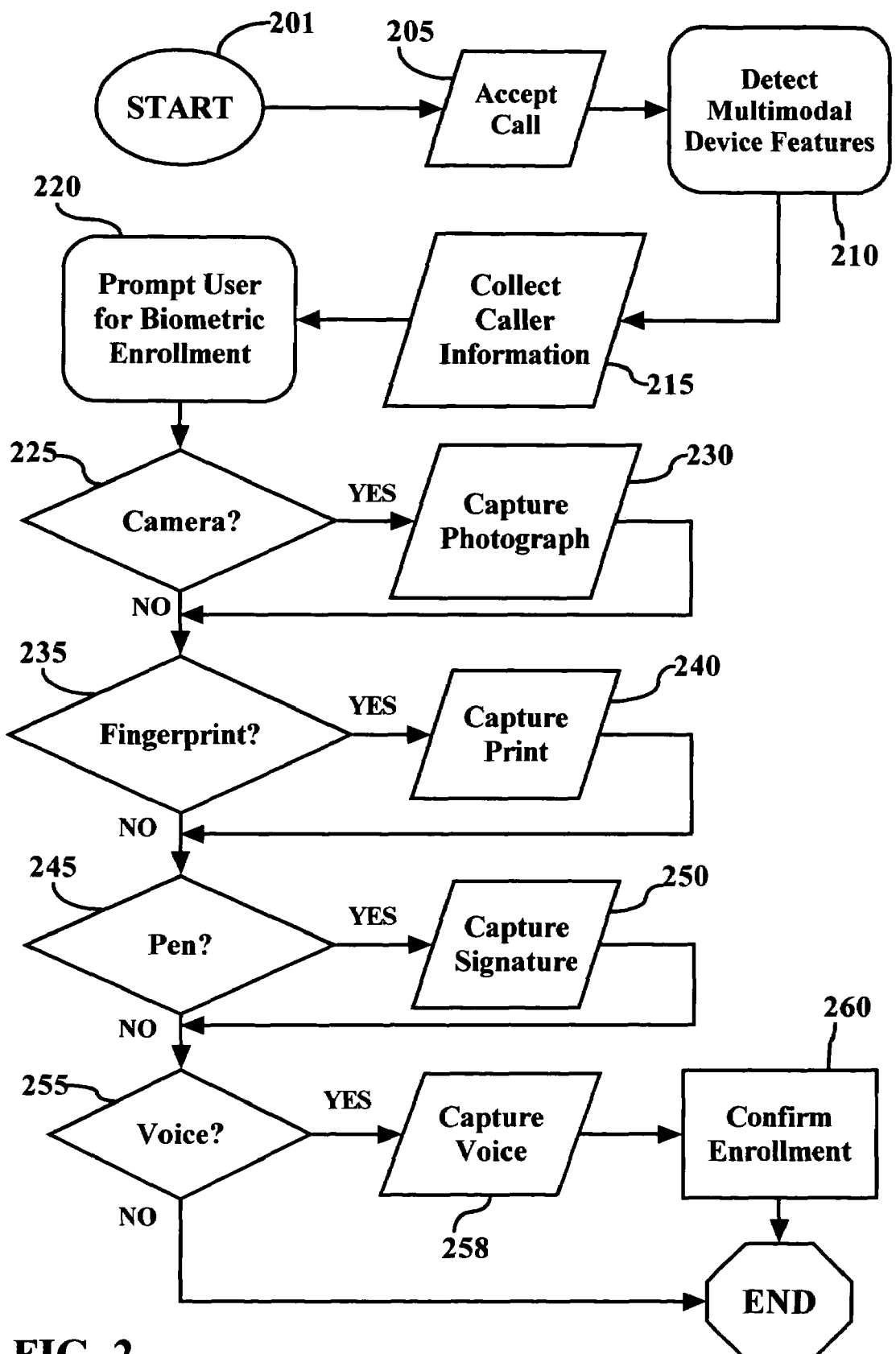
FIG. 2 is flowchart of the process for enrolling a user in the authentication and verification service of the present invention.

FIG. 2 is flowchart of the process for enrolling a user in the authentication and verification service of the present invention. After starting at step 201, a call is first accepted at 205. Step 205 can also entail logging onto a web based service, such that the central system 110 in FIG. 1 is a particular website, and the user connects to central system 110 via the internet 140 instead of PTSN 105. Once the user is connected to the central system 110, the system 110 automatically detects the type or multi-modal device that the user is using to connect at step 210. At step 210, the central system 110 reads the user device, and detects one or more multi-modal client features in the user device. The multi-modal client features in turn can define a first mode of biometric verification based on a first class of biometric data, such as voice recordings or voice prints. Alternatively, if the multi-modal device includes several modes of communication and includes several means for providing biometric data across various classes of data, such as signatures, images, fingerprints, etc., the system can detect this and proceed in the enrollment process accordingly.

At step 215, identifying information of a user is collected and stored in the central system database 115, which is in communication with the one or more voice applications 120. The process next prompts the user for biometric data in step 220. At step 225 it determines whether a camera is available in the user's multi-modal device. If so, a photograph or other image data of the user can be captured and stored in step 230. At step 235 it determines whether a fingerprint scan is available from the user's multi-modal device. If so, a fingerprint data can be captured and stored in step 240. At step 245 it determines whether a pen or writing transcription tool is available in the user's multi-modal device. If so, a signature of the user can be captured and stored at step 250. Finally, at step 255, the process can determine whether a voice-based mode of enrollment is available, and can prompt a user in step 258 to provide a voice print by recording the user's speech. The enrollment is confirmed at step 260. All of the biometric data captured and stored in any of steps 230, 240, 250, and 258 are included as part of the user's identifying information and may be referred to herein as the "biometric identifying data" of a user. All of the steps in FIG. 2 can be initially executed by the first application 120 that a user may connect to, along with its logic platform 125. The user's identifying information and biometric identifying data can be then transferred to the central system 110 and stored in the database 115 for retrieval by other applications 120, as explained below.

Figure 3:
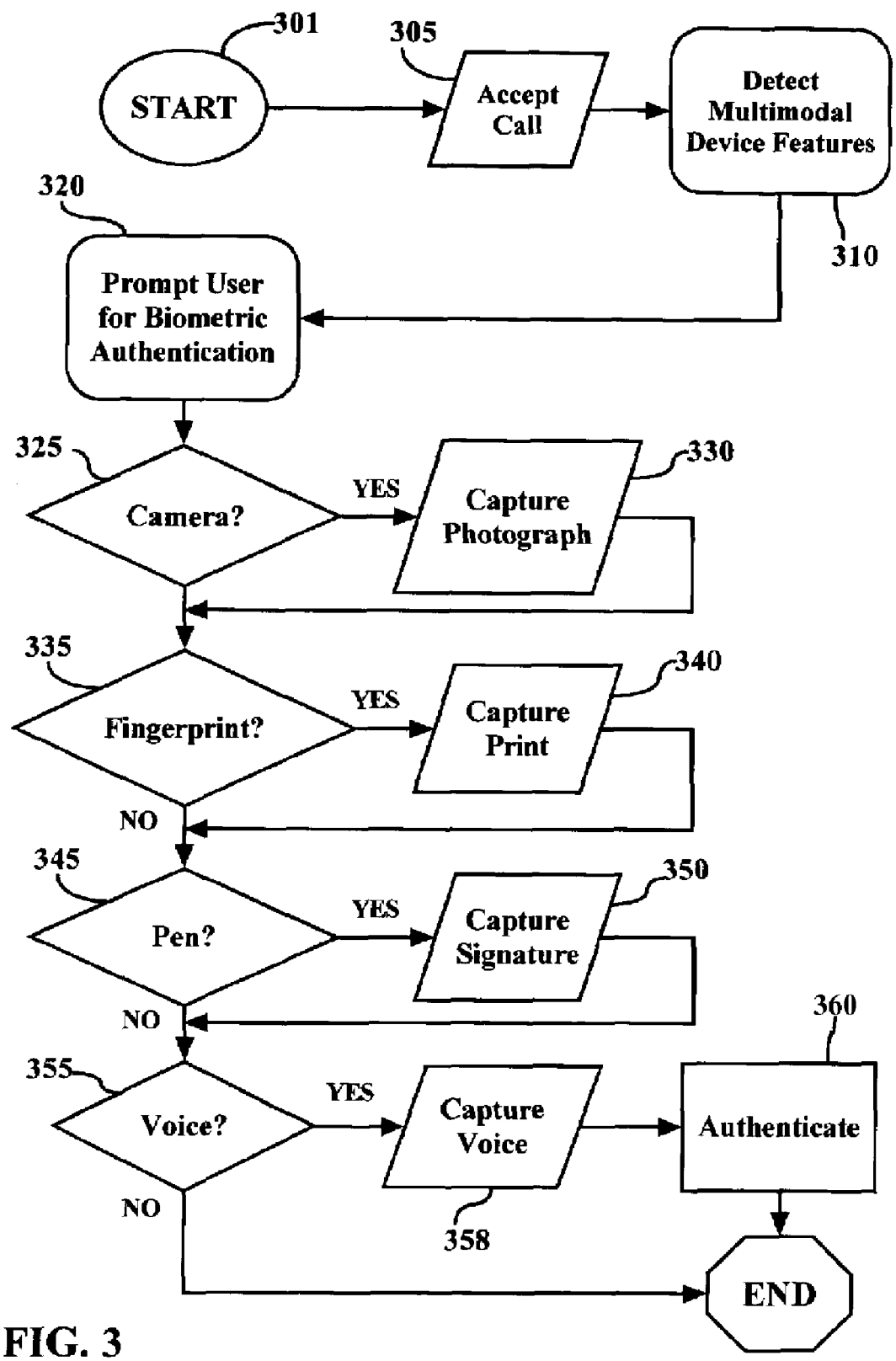
FIG. 3 is a flowchart of the process for authenticating a user enrolled in the authentication and verification service of the present invention.

Once a user is enrolled, any time a user accesses another application 120, such application 120 can communicate with the central system 110 to authenticate the user. FIG. 3 is a flowchart of the process for authenticating a user enrolled in the authentication and verification service of the present invention. Though this process, the application 120 detects the type of multi-modal device a user is using to connect with the application and collects the information and biometric data necessary for authentication. After accepting the connection at step 305, the user's device features are read and detected at step 310. The user is then prompted for a confirmatory biometric data at step 320. If at step 325 it is determined that a camera is available in the user's multi-modal device, a photograph or other image data of the user can be captured in step 330 and supplied as the user's confirmatory biometric data. If at step 335 it is determined that a fingerprint scan is available from the user's multi-modal device, a fingerprint data can be captured in step 340 and supplied as the user's confirmatory biometric data. If at step 345 it is determined that a pen or writing transcription tool is available in the user's multi-modal device, then a signature of the user can be captured at step 350 and supplied as the user's confirmatory biometric data. Finally, at step 355, it can be determined whether or not a voice-based mode of authentication is available. If so, the process can prompt a user in step 358 to provide a voice print by recording the user's speech. The user is then authenticated at step 360 by comparing the supplied confirmatory biometric data with the biometric identifying data stored in the central system 110 after the user had enrolled. If the confirmatory biometric data matches a portion of the biometric identifying data, the user is authenticated and his or her identity can be verified. Based upon how the application 120 is configured, the authentication can be done by telephone by transferring the telephone call to the centralized service provider managed by central system 110, or by sending a webservice message to the centralized biometric enrollment database 115 via secure internet access.

The key features of this invention are the ability to automatically detect the multi-modal client features of a user's device, and to biometrically authenticate a user based on the type of the user's device. The present invention can be web based for centralized access, and has the advantage of being able to verify a user through more than one means of biometric identification. By using the service implemented by the method and system of the present invention, a user does not have to remember numerous codes and data to identify his or herself. And, whenever a new interactive voice application is developed, it can simply use the service by connecting to the centralized system without having to re-implement any caller authentication logic with the new application. This will dramatically increase usage of multi-modal and speech based applications, ease the use of such applications, and result in significant gains in automation and efficiency.

The present invention can be realized in hardware, software, or a combination of hardware and software. An implementation of the method and system of the present invention can be realized in a centralized fashion in one computer system, or in a distributed fashion where different elements are spread across several interconnected computer systems. Any kind of computer system, or other apparatus adapted for carrying out the methods described herein, is suited to perform the functions described herein.

A typical combination of hardware and software could be a general purpose computer system with a computer program that, when being loaded and executed, controls the computer system such that it carries out the methods described herein. The present invention can also be embedded in a computer program product, which comprises all the features enabling the implementation of the methods described herein, and which, when loaded in a computer system is able to carry out these methods.

Computer program or application in the present context means any expression, in any language, code or notation, of a set of instructions intended to cause a system having an information processing capability to perform a particular function either directly or after either or both of the following a) conversion to another language, code or notation; b) reproduction in a different material form. Significantly, this invention can be embodied in other specific forms without departing from the spirit or essential attributes thereof, and accordingly, reference should be had to the following claims, rather than to the foregoing specification, as indicating the scope of the invention.

We claim:

1. A method for enrolling a user in an authentication and verification service comprising:
   connecting a user to a central system;
   detecting a type of multi-modal device used by the user to connect to the central system;
   determining a mode of biometric verification for the multi-modal device;
   enrolling the user using the determined mode of biometric verification; and,
   subsequently authenticating the user into multiple, different applications over the multi-modal device using the determined mode of biometric verification in the central system without requiring a new enrollment for each of the multiple, different applications.

2. The method of claim 1, wherein connecting a user to a central system, comprises connecting a user to a central system over a public switched telephone network from a telephone.

3. The method of claim 1, wherein connecting a user to a central system, comprises connecting a user to a central system over the Internet from a computer.

4. The method of claim 1, wherein determining a mode of biometric verification for the multi-modal device, comprises determining a mode of biometric verification for the multi-modal device selected from the group consisting of a voice enrollment, fingerprint enrollment, signature enrollment, and image enrollment.

* * * * *